US012508824B2

(12) United States Patent
Kobayashi et al.

(10) Patent No.: US 12,508,824 B2
(45) Date of Patent: Dec. 30, 2025

(54) PRINTING APPARATUS

(71) Applicant: BROTHER KOGYO KABUSHIKI KAISHA, Nagoya (JP)

(72) Inventors: Isao Kobayashi, Nagoya (JP); Yoshimitsu Taniguchi, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 408 days.

(21) Appl. No.: 18/062,061

(22) Filed: Dec. 6, 2022

(65) Prior Publication Data

US 2023/0202213 A1 Jun. 29, 2023

(30) Foreign Application Priority Data

Dec. 24, 2021 (JP) ................................. 2021-211490

(51) Int. Cl.
*B41J 11/42* (2006.01)

(52) U.S. Cl.
CPC .................................... *B41J 11/42* (2013.01)

(58) Field of Classification Search
CPC ....... B41J 11/0095; B41J 11/42; B41J 11/003; B41J 13/103; B41J 3/60; B65H 5/062; B65H 7/02; B65H 2513/13; B65H 2513/10; B65H 2701/1311
See application file for complete search history.

(56) References Cited

U.S. PATENT DOCUMENTS

| | | | | |
|---|---|---|---|---|
| 2001/0040684 | A1 | 11/2001 | Takahashi | |
| 2019/0232686 | A1 * | 8/2019 | Zaizen | B41J 11/009 |
| 2021/0178785 | A1 | 6/2021 | Miura | |
| 2021/0300092 | A1 * | 9/2021 | Yajima | B41J 3/60 |

FOREIGN PATENT DOCUMENTS

| | | | |
|---|---|---|---|
| JP | H7-215537 | A | 8/1995 |
| JP | H10-133519 | A | 5/1998 |
| JP | H10-304187 | A | 11/1998 |
| JP | 2001-341896 | A | 12/2001 |
| JP | 2002-104692 | A | 4/2002 |
| JP | 2003-231315 | A | 8/2003 |
| JP | 2016-75756 | A | 5/2016 |
| JP | 2018-186448 | A | 11/2018 |
| JP | 2019-130896 | A | 8/2019 |
| JP | 2021-94784 | A | 6/2021 |
| JP | 2021-154703 | A | 10/2021 |

* cited by examiner

*Primary Examiner* — Thinh H Nguyen
(74) *Attorney, Agent, or Firm* — Scully, Scott, Murphy & Presser, P.C.

(57) ABSTRACT

A printing apparatus includes: an accommodating unit accommodating a print medium; a first conveying unit picking up the print medium from the accommodating unit and conveying the print medium along a first conveying direction; a printing unit printing, on the print medium, print data included in a print job; a first detecting unit detecting front and rear ends in the first conveying direction of the print medium conveyed by the first conveying unit; and a controller. The controller executes: a length calculating process of calculating a print medium length as a length in the first conveying direction of the print medium; a setting process of setting a print starting position as a position at which printing is to be started in the printing unit; and a first printing process based on the print starting position set in the setting process.

15 Claims, 12 Drawing Sheets

PRINTING APPARATUS

REFERENCE TO RELATED APPLICATIONS

This application claims priority from Japanese Patent Application No. 2021-211490 filed on Dec. 24, 2021. The entire content of the priority application is incorporated herein by reference.

BACKGROUND ART

There is a conventionally known printing apparatus provided with a cutting unit which cuts a paper sheet of a regular size which is being conveyed for printing. In such a printing apparatus, for example, an A3 size paper sheet is cut equally into two to thereby generate two A4 size paper sheets.

DESCRIPTION

Incidentally, with respect to regular sized paper sheets which are used for the printing, there is a minute variation in the size within the dimensional tolerance per each paper sheet. In a case that the printing is performed with respect to the paper sheets each of which has the variation by using a default print starting position, a center position of each of the paper sheets and a center position of an image printed on each of the paper sheets is deviated slightly per each of the paper sheets in a conveying direction of the paper sheets.

In a case that such a paper sheet is cut in the above-described printing apparatus, for example, in the conveying direction of the paper sheet, there arises a variation in the distance from a cut position of the paper sheet and to a writing start position which is a forward end position of the image formed in the paper sheet. Due to this, paper sheets, which are obtained by cutting a paper sheet and in which the image is formed in different positions thereof with respect to the centers of the cut paper sheets, are discharged from the printing apparatus.

Further, also with respect to a printing apparatus which does not cut the paper sheet, in a case that the printing is performed on both sides (both surfaces) of a paper sheet, an image printed on the front surface of the paper sheet and an image printed on the back surface of the paper sheet are printed slightly deviated from each other in the conveying direction of the paper sheet, due to the variation in the size of paper sheet.

An aspect of the present disclosure has been made in view of the above-described problems, and an object of the aspect of the present disclosure is to make any variation in the distance in the conveying direction of a print medium from a processing position, in a case of processing the print medium, to a forward end of an image printed on the processed print medium to be small. Further, it is also an object of the aspect of the present disclosure is to make any variation in the conveying direction of print data, in a case of performing printing on both sides of the print medium, between the print data printed on the front surface of the print medium and the print data printed on the back surface of the print medium to be small.

According to an aspect of the present disclosure, there is provided a printing apparatus including:

- an accommodating unit configured to accommodate a print medium;
- a first conveying unit configured to pick up the print medium from the accommodating unit and to convey the print medium along a first conveying direction;

- a printing unit configured to print an image on the print medium in accordance with print data included in a print job;
- a first detecting unit configured to detect a front end and a rear end in the first conveying direction of the print medium being conveyed by the first conveying unit; and
- a controller configured to execute:
  - a length calculating process of calculating a print medium length which is a length in the first conveying direction of the print medium by using a result of a detection of the front end and the rear end of the print medium by the first detecting unit;
  - a setting process of setting, based on the print medium length calculated in the length calculating process, a print starting position as a position at which printing is to be started in the printing unit; and
  - a first printing process of printing the image on the print medium in accordance with the print data in the printing unit, based on the print starting position set in the setting process.

According to the aspect of the present disclosure, it is possible to provide a printing apparatus which is capable of making any variation in the distance in the conveying direction of the print medium from the processing position, in a case of processing the print medium, to the forward end in the conveying direction of the image printed on the processed print medium to be small, and which is capable of making any deviation in the conveying direction of print data, in a case of performing printing on the both sides of the print medium, between the print data printed on the front surface of the print medium and the print data printed on the back surface of the print medium to be small.

First Embodiment

In the following, a printing apparatus 1 according to a first embodiment of the present disclosure will be explained, with reference to FIGS. 1 to 6.

[Configuration of Printing Apparatus]

Figure 1:
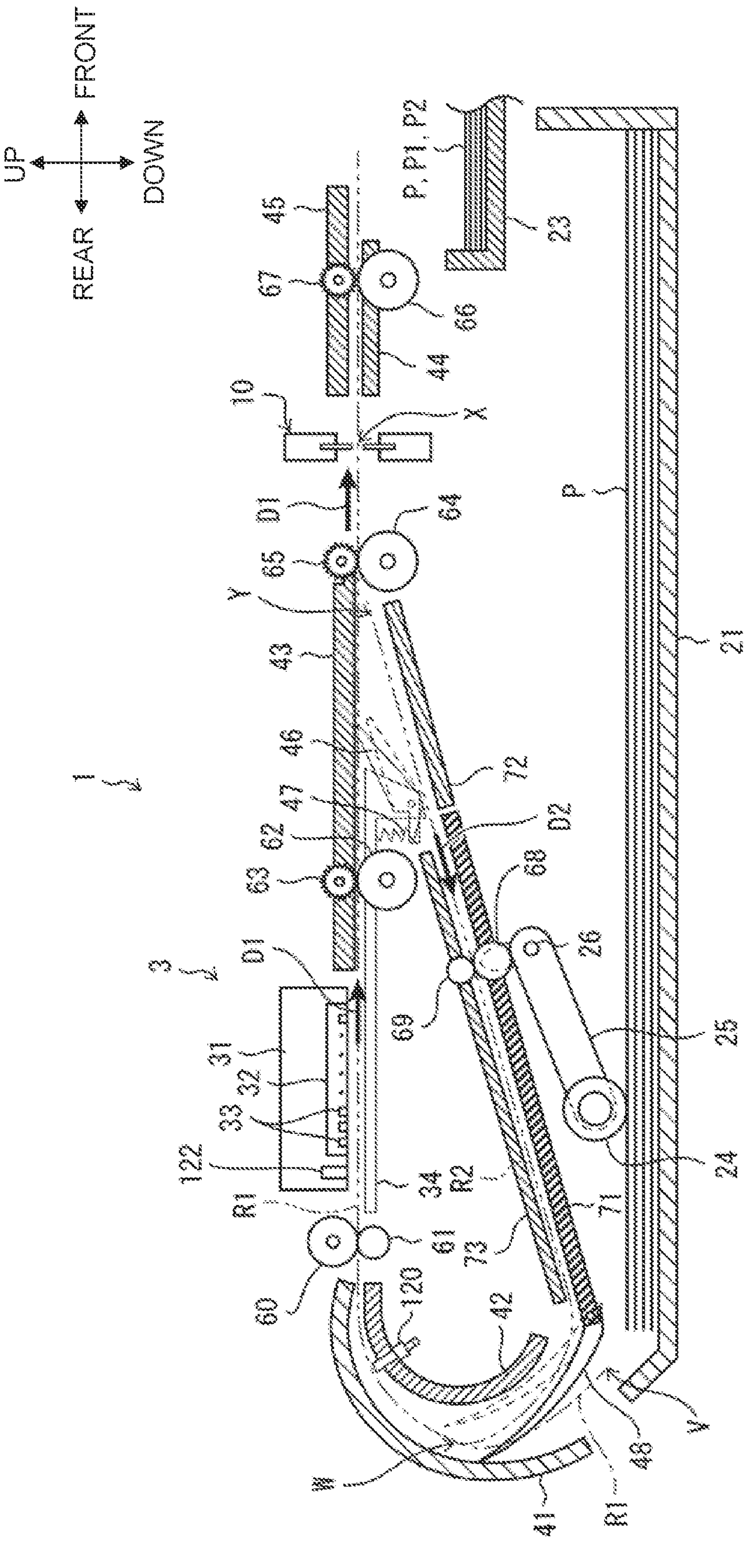
FIG. 1 is a cross sectional view depicting the internal structure of a printing apparatus according to a first embodiment.

FIG. 1 is a cross sectional view depicting the internal structure of the printing apparatus 1 according to the first embodiment. The printing apparatus 1 as depicted in FIG. 1 is a MFP (Multi-Function Peripheral) provided with a plurality of functions including, for example, a print function, a scan function, a copy function, a facsimile function, etc. Note that for the sake of convenience of explanation, the up-down direction and the front-rear direction of the printing apparatus 1 are defined as indicated by arrows in FIG. 1.

The printing apparatus 1 have the print function which is of an ink-jet system wherein, for example, an ink is ejected onto a paper sheet P (sheet P, paper P) as an example of a print medium to thereby perform printing of print data specified by a print job on the paper sheet P. The print data to be printed on the paper sheet P may be data for a color printing, or may be data only for a monochromatic printing. Further, the print medium is not limited to or restricted by a paper medium, and may be a resin medium such as an OHP sheet, other than the paper medium.

As depicted in FIG. 1, the printing apparatus 1 is provided with a feed tray 21, a discharge tray 23, a feed roller 24, a first conveying route R1, a printing unit 3, conveyance rollers 60, 62, 64, 66 and 68, a first flap 46, a second flap 48, a second conveying route R2 and a cutting unit 10. The feed roller 24 and the conveyance rollers 60, 62, 64 and 66 are an example of a "first conveying unit". Further, the conveyance rollers 64, 66 and 68 are an example of a "second conveying unit". Note that the number (quantity) of the respective rollers provided on the first conveying route R1 and the second conveying route R2 can be changed as appropriate; for example, the conveyance roller 66 may be omitted.

The feed tray 21 and the discharge tray 23 each of which is an example of an "accommodating unit" are detachably arranged in the printing apparatus 1. The feed tray 21 is a tray which is configured to accommodate a plurality of pieces of the paper sheet P, and of which upper surface is opened. A4-sized paper sheets P, as an example of a "first paper medium" are accommodated in the feed tray 21. Note that a plurality of feed trays may be arranged in the printing apparatus 1. The discharge tray 23 is arranged at a location above the feed tray 21. The discharge tray 23 is a tray which is configured to accommodate a paper sheet P discharged by the conveyance roller 66, a first paper sheet P and a second paper sheet P discharged by the conveyance roller 66, and of which upper surface is opened.

The feed roller 24 is a roller configured to feed the paper sheet P accommodated in the feed tray 21 to a conveyance starting position V of the first conveying route R1. The feed roller 24 is rotatably supported by a front end part of a feed arm 25. The feed arm 25 is pivotably supported by a shaft 26 supported by a frame of the printing apparatus 1. The feed roller 24 is normally rotated by driving of a feed motor 107 (see FIG. 2). By the normal rotation of the feed roller 24, the sheets P accommodated in the feed tray 21 are feed, one by one, to the conveyance starting position V of the first conveying route R1.

The first conveying route R1 is a space defined by guide members 41, 42, 43, 44 and 45, a platen 34 and the printing unit 3. The first conveying route R1 is a route starting from the feed tray 21 and reaching the discharge tray 23, via the printing unit 3. The first conveying route R1 extends upward from a rear end part of the feed tray 21. The first conveying route R1 is curved in an area thereof which is defined by the guide members 41 and 42, and extends linearly in an area thereof which is defined by the guide members 43 and 44, via the position of the printing unit 3. Here, a direction in which the paper sheet P fed to the first conveying route 41 is conveyed from the rear side to the front side of the printing apparatus 1 is referred to as a first conveying direction D1.

Figure 2:
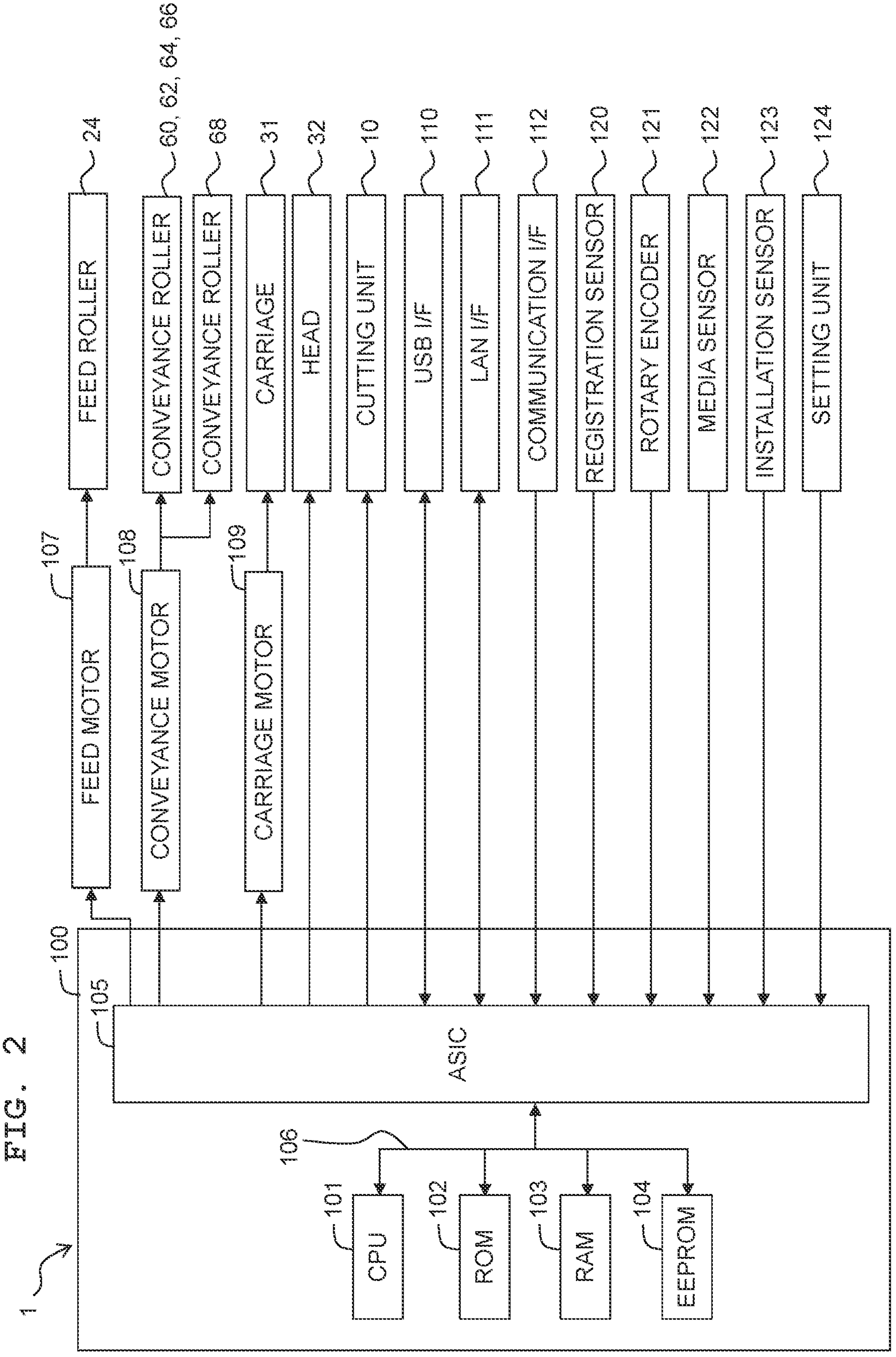
FIG. 2 is a block diagram depicting the electric configuration of the printing apparatus according to the first embodiment.

The conveyance roller 60 is arranged in the first conveying route R1 at a location on the upstream side in the first conveying direction D1 with respect to the printing unit 3. A pinch roller 61 is arranged at a position facing a lower part of the conveyance roller 60. The conveyance roller 60 is driven by a conveyance motor 108 depicted in FIG. 2. The pinch roller 61 rotates accompanying with the rotation of the conveyance roller 60. By the conveyance roller 60 and the pinch roller 61 which are rotated normally, the paper sheet P is pinched or held by the conveyance roller 60 and the pinch roller 61 and is conveyed up to the printing unit 3. The printing unit 3 is provided on the first conveying route R1, at a location between the conveyance roller 60 and the conveyance roller 62. The printing unit 3 has a carriage 31, a head 32, a nozzle 33 and the platen 34. A driving force of a carriage motor 109 depicted in FIG. 2 is transmitted to the carriage 31 to thereby reciprocate the carriage 31 in a width direction (a direction orthogonal to the first conveying direction D1) of the paper sheet P. The head 32 is mounted on the carriage 31. A plurality of pieces of the nozzle 33 are provided on a lower surface of the head 32. Ink droplets (droplets of ink) are ejected from the plurality of nozzles 33 to thereby perform printing on the paper sheet P. The platen 34 is a member which has a rectangular shape and on which the paper sheet P is placed.

The ink droplets are ejected selectively from the plurality of nozzles 33 with respect to the paper sheet P supported by the platen 34 in a process in which the carriage 31 moves, to thereby perform the printing on the paper sheet P. The printing is performed with respect to the paper sheet P, based on a print starting position PL (see FIG. 3) which is set. A controller 100 (see FIG. 2) performs the printing with respect to the paper sheet P by repeating a printing process of discharging the ink from the plurality of nozzles 33 while moving the carriage 31 in the width direction of the paper sheet P in a state that the conveyance of the paper sheet P is stopped to thereby perform printing corresponding to one line on the paper sheet P, and a line feeding process of driving the conveyance rollers 60 and 62 to thereby convey the paper sheet P by a predetermined line feed amount.

As depicted in FIG. 1, the conveyance roller 62 is arranged in the first conveying route R1 at a location on the downstream side in the first conveying direction D1 with respect to the printing unit 3. A spur roller 63 is arranged at a position facing an upper part of the conveyance roller 62. The conveyance roller 62 is driven by the conveyance motor 108 depicted in FIG. 2. The spur roller 63 rotates accompanying with the rotation of the conveyance roller 62. By the conveyance roller 62 and the spur roller 63 which are rotated normally, the paper sheet P is pinched or held by the conveyance roller 62 and the spur roller 63 and is conveyed toward the downstream side in the first conveying direction D1.

Further, as depicted in FIG. 1, the conveyance roller 64 is arranged in the first conveying route R1 at a location on the downstream side in the first conveying direction D1 with respect to the conveyance roller 62. A spur roller 65 is arranged at a position facing an upper part of the conveyance roller 64. The conveyance roller 64 is driven by the conveyance motor 108. The spur roller 65 rotates accompanying with the rotation of the conveyance roller 64. By the conveyance roller 64 and the spur roller 65 which are rotated normally, the paper sheet P is pinched or held by the conveyance roller 64 and the spur roller 65 and is conveyed toward the cutting unit 10.

On the other hand, by the conveyance roller 64 and the spur roller 65 which are rotated reversely, the sheet P is pinched by the conveyance roller 64 and the spur roller 65 and is conveyed to the second conveying route R2 along a lower surface of the first flap 46. Here, a direction which is opposite (reverse) to the first conveying direction D1 and in which the sheet P conveyed to the second conveying route R2 is moved from the front side to the rear side of the printing apparatus 1 is referred to as a second conveying direction D2.

The first flap 46 is provided in the first conveying route R1 at a location between the conveyance roller 62 and the conveyance roller 64. The first flap 46 is arranged in the vicinity of a branching position Y facing the guide member 43. The first flap 46 is supported by the platen 34 to be pivotable between a first state and a second state. The first flap 46 is urged by a coil spring 47 to be in the first state. In the first state indicated by solid lines in FIG. 1, the first flap 46 makes contact with the guide member 43 so as to close the first conveying route R1. On the other hand, in the second state indicated by broken lines in FIG. 1, the first flap 46 is positioned to be lower than in the first state, is separated from the guide member 43, and allows the paper sheet P which is being conveyed in the first conveying direction D1 to pass.

The cutting unit 10 is arranged in the first conveying route R1 at a location between the conveyance roller 64 and the conveyance roller 66. The cutting unit 10 is a well-known cutter mechanism. The cutting unit 10 cuts the paper sheet P at a cutting position CL (see FIG. 3) which is set to thereby divide the paper sheet P equally into n pieces (n is an integer not less than 2 (two)).

Figure 3:
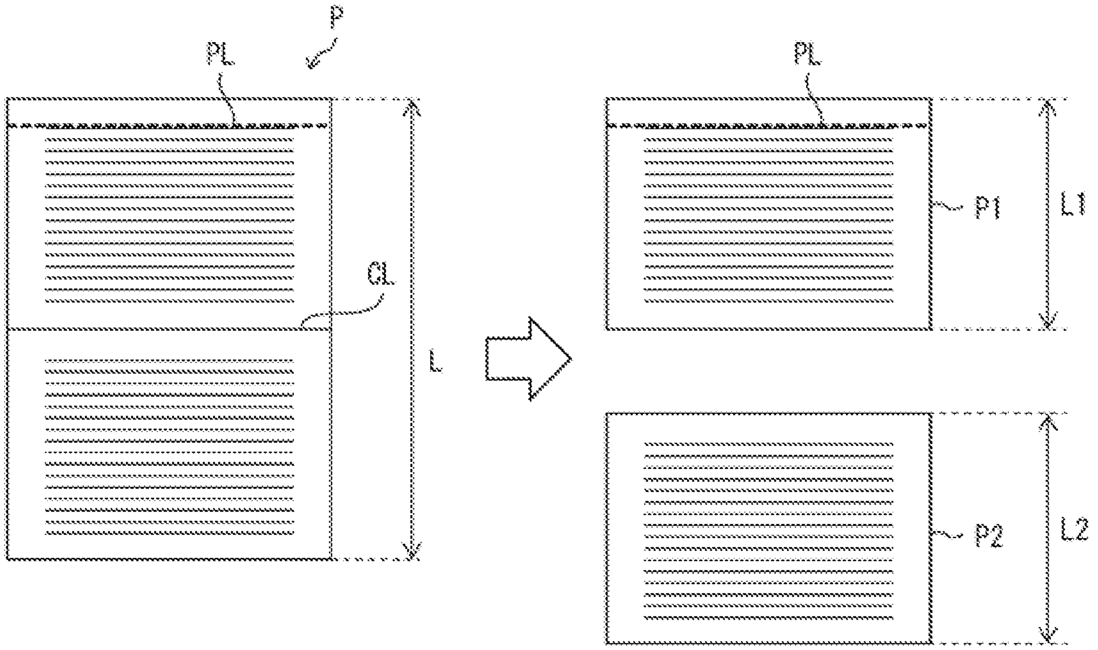
FIG. 3 is a view depicting a paper sheet before cutting, and a first paper sheet and a second paper sheet which are generated after the cutting.

FIG. 3 is a view depicting the paper sheet P (having a length L) before cutting, and a first paper sheet P1 (having a length L1) and a second paper sheet P2 (having a length L2) which are generated after the cutting. FIG. 3 depicts an example in which the paper sheet P is divided equally into two pieces. The paper sheet P is cut at the cutting position CL by the cutting unit 10, and are divided into the first paper sheet P1 and the second paper sheet P2. For example, in a case that the paper sheet P is an A4-sized paper sheet, a first paper sheet P1 and a second paper sheet P2 each of which is an A5-sized paper sheet are generated. Note that the paper sheet P is conveyed to the first conveying route R1 so that the first paper sheet P1 precedes the second paper sheet P2 in the first conveying direction D1.

The conveyance roller 66 is arranged in the first conveying route R1 at a location on the downstream side in the first conveying direction D1 with respect to the cutting unit 10. A spur roller 67 is arranged at a position facing an upper part of the conveyance roller 66. The conveyance roller 66 is driven by the conveyance motor 108 depicted in FIG. 2. The spur roller 67 rotates accompanying with the rotation of the conveyance roller 66. By the conveyance roller 66 and the spur roller 67 which are rotated normally, the paper sheet P, the first paper sheet P1 and the second paper sheet P2 are held by the conveyance roller 66 and the spur roller 67 and are discharged to the discharge tray 33.

As depicted in FIG. 1, the second flap 48 is pivotably arranged at a joining position W between the first conveying route R1 and the second conveying route R2. Specifically, the second flap 48 is pivotable between a first state indicated by solid lines in FIG. 1 and a second state indicated by broken lines in FIG. 1. In a case that the second flap 48 is in the first state, a part of the second conveying route R2 is constructed by the second flap 48 and the guide member 42. Further, in a case that the second flap 48 is in the second state, a part of the first conveying route R1 is constructed by the second flap 48 and the guide member 41.

A registration sensor 120 as an example of a "first detecting unit" is provided on the first conveying route R1 at a location on the upstream side with respect to the conveyance roller 60. The registration sensor 120 is a sensor configured to detect that a front end or a rear end of the paper sheet P passes a contact position with respect to the conveyance roller 60. It is possible to use, as the registration sensor 120, a sensor having an actuator configured to rock in a case that the paper sheet P makes contact with the sensor, an optical sensor, etc.

A rotary encoder 121 (see FIG. 2) configured to detect the rotation of the conveyance roller 60 is provided on the conveyance roller 60. The rotary encoder 121 is configured to output a pulse signal, in accordance with the rotation of the conveyance roller 60, to the controller 100 (see FIG. 2). The rotary encoder 121 has an encoder disk and an optical sensor. The encoder disc rotates together with the rotation of the conveyance roller 60. The optical sensor reads the encoder disk which is rotating, generates a pulse signal, and outputs the generated pulse signal to the controller 100.

A media sensor 122 is provided on the printing unit 3. The media sensor 122 is a sensor configured to detect whether or not the paper sheet P is present on the platen 34. The media sensor 122 is used to detect that the front end of the paper sheet P which is being conveyed in the first conveying route R1 has reached the printing unit 3.

The second conveying route R2 is a route defined by guide members 71, 72 and 73. The conveyance roller 68 and a pinch roller 69 are arranged in the second conveying route R2. The second conveying route R2 is branched from the first conveying route R1 at the branching position Y which is on the upstream side in the first conveying route R1 with respect to the conveyance roller 64, and is connected to the joining position W which is on the upstream side in the first conveying direction D1 with respect to the printing unit 3 in the first conveying rote R1.

In a case that the controller 100 reversely rotate the conveyance rollers 64 and 66 and rotates the conveyance roller 68, the paper sheet P having the print data printed on one surface thereof is conveyed along the second conveying direction D2 in the second conveying route R2. The paper sheet P which is conveyed to the second conveying route R2 is thereby conveyed to the first conveying route R1 in a state that the front side and the back side thereof are reversed once. With this, it is possible to perform printing, by the printing unit 3, on the both surfaces of the paper sheet P.

[Electric Configuration of Printing Apparatus]

With reference to FIG. 2, an explanation will be given about the electric configuration of the printing apparatus 1. The printing apparatus 1 is provided with the controller 100, the feed motor 107, the conveyance motor 108, the carriage motor 109, an USB interface (I/F) 110, a LAN interface (I/F) 111, a communication interface (I/F) 112, an installation sensor 123 and a setting unit 124, in addition to the respective parts which are described above.

The controller 100 has a CPU (Central Processing Unit) 101, a ROM (Read Only Memory) 102, a RAM (Random Access Memory) 103, an EEPROM 104 (EEPROM is a registered trademark of Renesas Electronics Corporation) and an ASIC (Application Specific Integrated Circuit) 105 which are connected by an internal bus 106.

The ROM 102 stores a program, etc., with which the CPU 101 controls respective operations. The controller 100 controls the feed motor 107, the conveyance motor 108, the carriage motor 109, the head 32, the cutting unit 10, etc., based on a control program read by the controller 100 from the ROM 102. Further, the EEPROM 104 stores data with respect to a calculated length of the paper sheet P, such as, a calculated length (lengths) L of the paper sheet P, an average value Lave of the calculated length(s) L of the paper sheet P, etc. The RAM 103 is used as a memory area configured to temporarily store data, signal, etc., to be used by the CPU 101 in a case that the CPU 101 executes the program, or is used as a workspace for data processing. The EEPROM 104 stores information which is to be held even after the power source is switched off. The EEPROM 104 stores information which is previously set, such as, for example, a length Ldef of the paper sheet which is previously set with respect to each of a plurality of kinds of paper sheets P, an appropriate range of the length of the paper sheet, an adjustment range of the print starting position, a default value PLdef of the print starting position, a default value CLdef of the cutting position, etc.

The feed motor 107, the conveyance motor 108, the carriage motor 109, the head 32, the cutting unit 10, the USB interface 110, the LAN interface 111, the communication interface 112, the registration sensor 120, the rotary encoder 121, the media sensor 122, the installation sensor 123 as an example of a "second detecting unit", and the setting unit 124 are connected to the ASIC 105. The ASIC 105 supplies a driving current to the feed motor 107, the conveyance motor 108 and the carriage motor 109. The controller 100 controls, for example, by the PWM (Pulse Width Modulation) control, the rotation of each of the feed motor 107, the conveyance motor 108 and the carriage motor 109.

Further, the controller 100 applies a driving voltage to a vibrating element of the head 32 to thereby cause an ink droplet to be ejected from each of the plurality of nozzles 33. Furthermore, the registration sensor 120, the rotary encoder 121, the media sensor 122 and the installation sensor 123 are connected to the ASIC 105. Moreover, the controller 100 detects the state of the printing apparatus 1 based on a signal outputted from each of the registration sensor 120, the rotary encoder 121, the media sensor 122 and the installation sensor 123.

The registration sensor 120 outputs an ON signal in a state that the paper sheet P passes the position of the registration sensor 120, and outputs an OFF signal in a state that the paper sheet P does not pass the position of the registration sensor 120. Namely, the registration sensor 120 outputs the ON signal during a period of time from a timing at which the front end of the paper sheet P reaches the position of the registration sensor 120 and until the rear end of the paper sheet P passes the position of the registration sensor 120; the registration sensor 120 outputs the OFF signal during a period of time different from the above-described period of time. The detection signal by the registration sensor 120 is outputted to the controller 100.

The installation sensor 123 is provided on the feed tray 21, and detects as to whether or not the feed tray 21 is installed in the printing apparatus 1. The installation sensor 123 is an example of a "second detecting unit". The installation sensor 123 outputs an ON signal to the controller 100 in a state that the feed tray 21 is installed in the printing apparatus 1; the installation sensor 123 outputs an OFF signal to the controller 100 in a state that the feed tray 21 is not installed in the printing apparatus 1. As the installation sensor 123, it is possible to use a physical sensor configured to detect the installment of the feed tray 21 by making contact with the feed tray 21, an optical sensor having a light-emitting unit and a light-receiving unit, etc. Note that the printing apparatus 1 may be provided with a sensor, as a third detecting unit, which is configured to detect that the feed tray 21 is detached, instead of the installation sensor 123. Further, the printing apparatus 1 is provided with a sensor, as a fourth detecting unit, which is configured to detect as to whether or not the paper sheet(s) P is/are accommodated in the feed tray 21.

The setting unit 124 which has a displaying screen is provided on the printing apparatus 1. The setting unit 124 is constructed, for example, of a touch panel; a user is capable of performing a variety of kinds of setting regarding the printing of the printing apparatus 1 by performing a touch operation with respect to the touch panel. The setting unit 124 receives, for example, a setting of the size of the paper sheet P, a setting as to whether or not the cutting process is to be executed, etc. Information set by the setting unit 124 is outputted to the controller 100.

A USB memory, a USB cable, etc., are connected to the USB interface 110. A PC is connected, via a LAN cable, to the LAN interface 111. In a case that the controller 100 receives the print job via the USB interface 110 or the LAN interface 111, the controller 100 controls the respective parts or components of the printing apparatus 1 to thereby perform printing of the print data, which is specified or designated by the print job, on the paper sheet P.

[Flow of Control by Controller]

Figure 5:
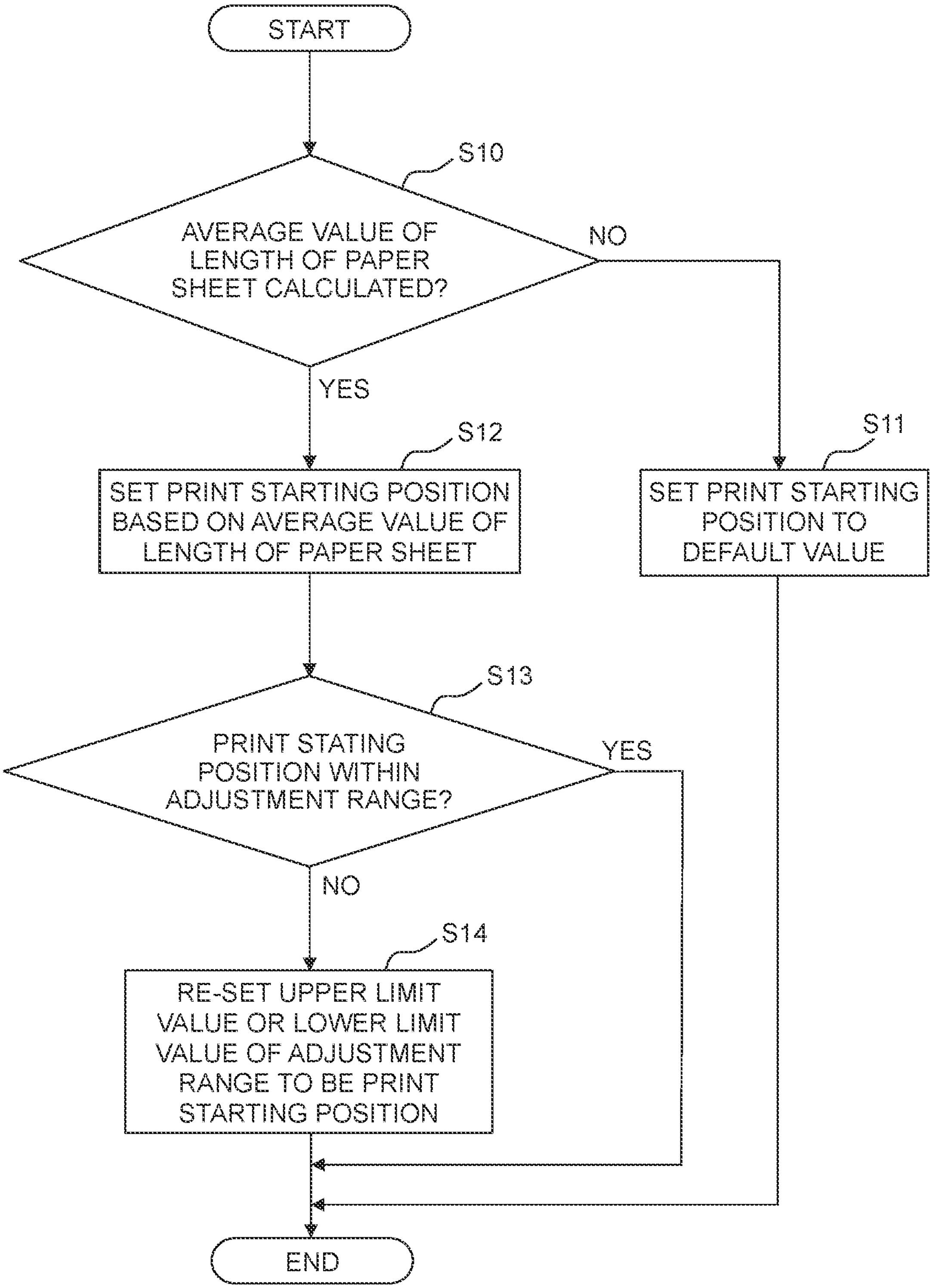
FIG. 5 is a flow chart depicting a setting process of FIG. 4.
Figure 6:
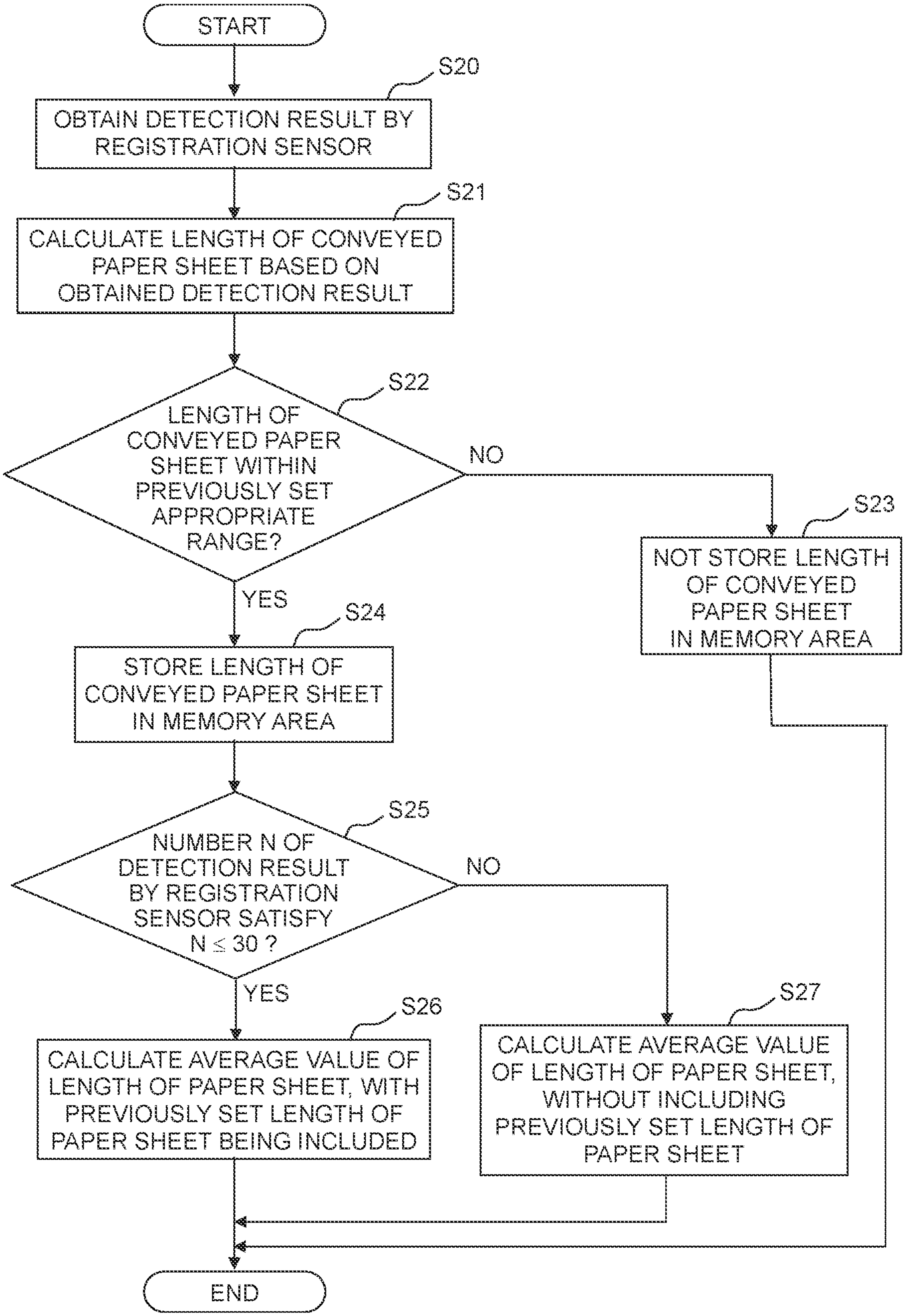
FIG. 6 is a flow chart depicting a length calculating process of FIG. 4.

Next, the flow of the control by the controller 100 of the printing apparatus 1 will be explained, with reference to the flow charts of FIGS. 4 to 6. Note that the flow charts depicted, respectively, in FIGS. 4 to 6 are examples, and the present disclosure is not limited to or restricted by these flow charts.

Figure 4:
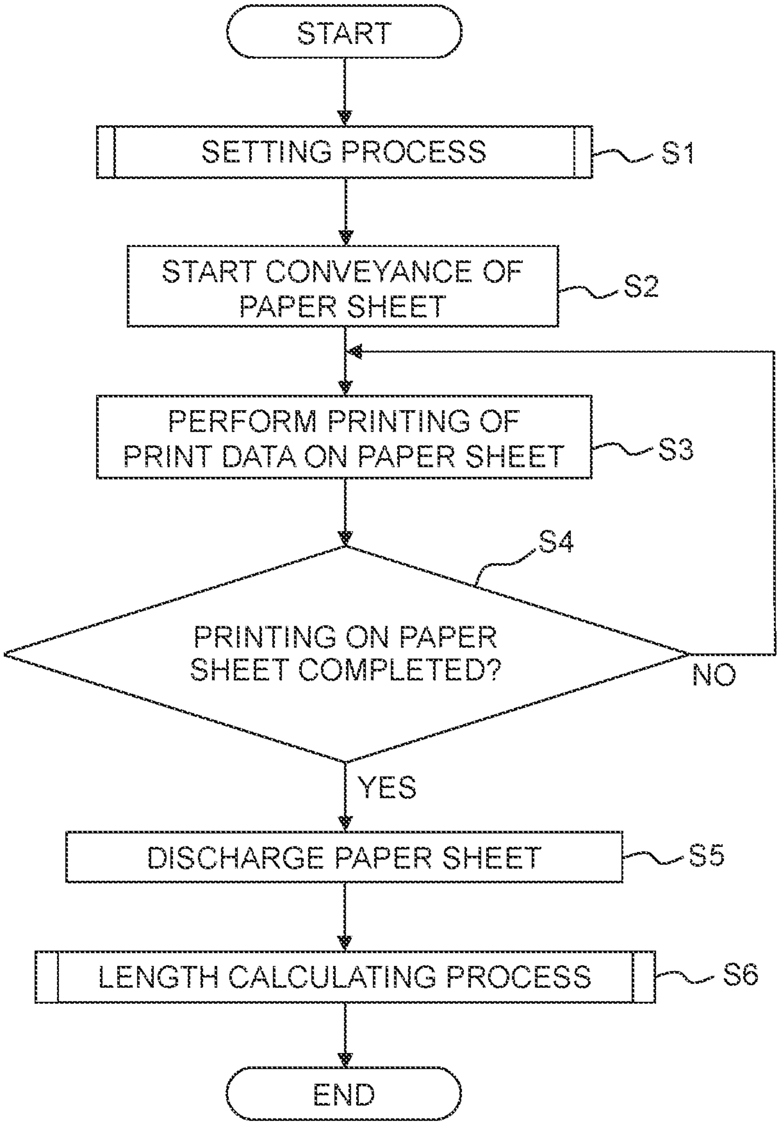
FIG. 4 is a flow chart depicting the flow of control by a controller of the printing apparatus according to the first embodiment.

As depicted in FIG. 4, in a case that the controller 100 receives the print job via the USB interface 100 or the LAN interface 111, etc., the controller 100 executes the setting process (step S1).

Here, the setting process (step S1) will be explained, with reference to FIG. 5. First, the controller 100 determines, in a length calculating process S6 which will be described later on, as to whether or not the average value Lave of the length L in the first conveying direction D1 of the paper sheet P has been calculated (step S10). The average value Lave is an example of a "print medium length". In a case that the average value Lave has not been calculated (step S10: NO), the controller 100 sets the print starting position PL to be the default value PLdef (step S11). Then, the controller 100 ends the setting process S1. In a case the average value Lave has been calculated (step S10: YES), the controller 100 sets the print staring position PL based on the calculated average value Lave (step S12).

In step S12, the controller 100 sets the print starting position PL by using the default value PLdef of the print starting position with respect to the paper sheet P designated in the print job, the average value Lave calculated in step S6 and the length Ldef in the first conveying direction D1 of the paper sheet P previously set with respect to the paper sheet P designated by the print job. The controller 100 sets the print starting position PL based on the following expression (1).

$$PL=\text{PLdef}+(\text{Lave}-\text{Ldef})/2 \quad (1)$$

Next, the controller 100 determines as to whether or not the print starting position PL set in step S12 is within the adjustment range previously determined with respect to the paper sheet P designated in the print job (step S13). As an example of the adjustment range previously set, it is allowable to use a permissible error of the standard with respect to the size of the paper sheet P designated in the print job. In a case that the print starting position PL which has been set is included within the adjustment range (step S13: YES), the controller 100 ends the setting process S1. In a case that the print starting position PL which has been set is not included within the adjustment range (step S13: NO), the controller 100 re-sets an upper limit value or a lower limit value of the adjustment range as the print starting position PL (step S14).

In step S14, in a case that the print starting position PL set in step S12 exceeds the upper limit value of the adjustment range, the controller 100 sets the print starting position PL to be the upper limit value of the adjustment range. In step S14, in a case that the print starting position PL set in step S12 is less than the lower limit value of the adjustment range, the controller 100 sets the print starting position PL to be the lower limit value of the adjustment range. Afterwards, the controller 100 ends the setting process S1.

Returning again to FIG. 4, the explanation of the flow of the control by the controller 100 will be continued. The controller 100 drives the feed motor 107 and the conveyance motor 108 to thereby convey the paper sheet P to the first conveying route R1 by the feed roller 24 and the conveyance rollers 60, 62, 64 and 66 (step S2). The controller 100 controls the printing unit 3 to thereby print the print data with respect to the paper sheet P conveyed in step S2 (step S3). In step S3, the controller 100 starts the printing of the print data with respect to the paper sheet P, based on the print starting position PL set in step S1. Afterwards, the controller 100 determines as to whether or not the printing with respect to the paper sheet P is completed (step S4). In a case that the printing with respect to the paper sheet P is not completed (step S4: NO), the controller 100 executes Step S3 again. In a case that the printing with respect to the paper sheet P is completed (step S4: YES), the controller 100 discharges the paper sheet P, for which the printing has been completed, to the discharge tray 23 (step S5).

Next, the controller 100 executes the length calculating process (step S6). The length calculating process S6 will be explained, with reference to FIG. 6. First, the controller 100 obtains, from the registration sensor 120, the result of a detection of the front end and the rear end of the paper sheet P conveyed in step S2 (step S20). In step S20, the controller 100 refers to a timing at which the ON signal is outputted from the registration sensor 120, as the result of the detection of the front end of the paper sheet P. Further, in step S20, the controller 100 refers to a timing at which the ON signal outputted from the registration sensor 120 is switched to the OFF signal, as the result of the detection of the rear end of the paper sheet P.

Afterwards, the controller 100 calculates the length L in the first conveying direction D1 of the paper sheet P conveyed in step S2, from the obtained result of the detection by the registration sensor 120 (step S21). In step S21, the controller 100 calculates the length L in the first conveying direction D1 of the paper sheet P, from a conveyance amount of the paper sheet P conveyed during a period of time in which the registration sensor 120 is outputting the ON signal. The conveyance amount of the paper sheet P is presumed from a rotation amount of the rotary encoder 121. In step S21, the controller 100 refers to a conveying speed of the paper sheet P during the period of time in which the registration sensor 120 is outputting the ON signal. The controller 100 corrects the length L of the paper sheet P depending on the conveying speed of the paper sheet P.

Note that in a case that the conveying speed of the paper sheet P is previously determined, the controller 100 may calculate the length L of the paper sheet P based on a period of time since the registration sensor 120 has detected the front end of the paper sheet P and until the registration sensor 120 detects the rear end of the paper sheet P, and based on the conveying speed of the paper sheet P. In this case, the controller 100 presumes the conveying amount of the paper sheet P from the time during which the ON signal is being outputted.

Next, the controller 100 determines as to whether or not the length L of the paper sheet P calculated in step S21 is within the appropriate range of the paper sheet which has been previously set with respect to the paper sheet P designated in the print job (step S22). In step S22, the controller 100 refers to the appropriate range stored in a memory area provided on the printing apparatus 1. In a case that the length L of the paper sheet P is not included in the appropriate range (step S22: NO), the controller 100 does not store the length L of the conveyed paper sheet P in the memory area provided on the printing apparatus 1 (step S23). Afterwards, the controller 100 ends the length calculating process. In a case that the length L of the paper sheet P is included in the appropriate area (step S22: YES), the controller 100 stores the length L of the paper sheet P in the memory area provided on the printing apparatus 1 (step S24). The calculated length L of the paper sheet P is stored in a non-volatile memory area provided on the printing apparatus 1.

Next, the controller 100 determines as to whether or not a number N of the result of the detection by the registration sensor 120 is not more than 30 (thirty) (step S25). Note that in step S25, the value compared with the number N of the result of the detection by the registration sensor 12 is not limited or restricted by 30, and may be changed as appropriate. In a case that the number N of the result of the detection by the registration sensor 120 is not more than 30 (step S25: YES), the controller 100 calculates the average value Lave of the length L of the paper sheet P by including the length Ldef of the paper sheet which is previously set with respect to the paper sheet P (step S26). In step S26, the controller 100 calculates the average value Lave by using the length L of not less than 1 (one) piece of the paper sheet P stored in the memory area provided on the printing apparatus 1 in step S24, and by using the length Ldef of the paper sheet P previously set regarding the paper sheet P designated in the print job (step S26). Afterwards, the controls 100 ends the length calculating process S6.

In a case that the number N of the result of the detection by the registration sensor 120 is greater than 30 (step S25: NO), the controller 100 calculates the average value Lave by using only the length(s) L of not less than one paper sheet P stored in step S24 in the memory area provided on the printing apparatus 1 (step S27). Namely, in step S27, the controller 100 calculates the average value Lave without using the length Ldef of the paper sheet which is previously set with respect to the size of the print medium designated in the print job. Afterwards, the controller 100 ends the length calculating process S6.

(Operation and Effect of the Present Embodiment)

According to the present embodiment, as explained above, the controller 100 calculates the average value Lave of the length L in the first conveying direction D1 of the paper sheet P calculated in the length calculating process S6, and determines the print starting position PL of the print data to be printed on the paper sheet P, based on the average value Lave calculated in the length calculating process S6. Accordingly, it is possible to make any deviation occurring between the center position in the first conveying direction D1 of the paper sheet P and the center position of the print data to be printed on the paper sheet P to be small. With this, for example, in a case that the paper sheet P is cut by using a cutting machine, etc., it is possible to make any variation or fluctuation in the distance in the first conveying direction D1 from the cutting position of the paper sheet P to the forward end of the image printed on the cut paper sheet P to be small. Further, in a case of performing the printing on both surfaces of the paper sheet P, it is possible to make any deviation in the first conveying direction D1 between the print data printed on the front surface of the paper sheet P and the print data printed on the back surface of the paper sheet P to be small.

According to the above-described configuration, in the length calculating process S6, the controller 100 uses the plurality of results of the detections with respect to the front end and the rear end of the paper sheet P by the registration sensor 120 so as to calculate the length L in the first conveying direction D1 of the paper sheet P, as the print medium length to be used in the setting process S1. Further, the controller 100 calculates the average value Lave of the length L of the paper sheet P in the length calculating process S6. Accordingly, the print starting position PL of the paper sheet P does not deviate greatly per each of the paper sheets PL which are conveyed. With this, it is possible to maintain the quality of the print data printed on the paper sheet P in a stabilized state.

According to the above-described configuration, in a case that the number (quantity) of the result of the detection of the front end and the rear end of the paper sheet P by the registration sensor 120 is not more than the predetermined number, then in the length calculating process S6, the controller 100 uses the length L of the paper sheet P calculated from the result of the detection by the registration sensor 120 and the length Ldef of the paper sheet P previously set with respect to the paper sheet P designated in the print job so as to calculate the average value Lave of the paper sheet P. Accordingly, it is possible to prevent the occurrence of such a situation that the average value Lave becomes to be unreasonably or unduly greater than the size of the paper sheet P designated in the print job. With this, it is possible to maintain the quality of the print data printed on the paper sheet P.

According to the above-described configuration, in a case that the length L of the paper sheet P calculated from the result of the detection by the registration sensor 120 is not included in the appropriate range previously set regarding the paper sheet P designated in the print job, the controller 100 does not use, in the length calculating process S6, the length L of the paper sheet P for the calculation of the average value Lave. Accordingly, it is possible to prevent the average value Lave to be greater than assumed. With this, it is possible to maintain the quality of the print data printed on the paper sheet P.

According to the above-described configuration, in a case that the print starting position PL set in the setting process S1 is not included in the adjustment range previously set regarding the size of the paper sheet P designated in the print job, the controller 100 sets the print starting position PL based on the upper limit value or the lower limit value of the adjustment range. As an example of the adjustment range previously set, it is allowable to use the permissible error of the standard with respect to the size of the paper sheet P designated in the print job. Accordingly, in the first conveying direction D1, the center position of the length of the paper sheet P does not deviate greatly with respect to the center position of the print data to be printed on the paper sheet P. With this, it is possible to prevent any lowering in the quality of the print data printed on the print medium.

According to the above-described configuration, the print medium length is calculated based on the conveying speed by which the print medium is conveyed by the first conveying unit. Accordingly, there is no deviation in the print medium length which would have otherwise occurred due to the difference in the conveying speed. With this, it is possible to improve the accuracy of calculating the print medium length.

Second Embodiment

Figure 7:
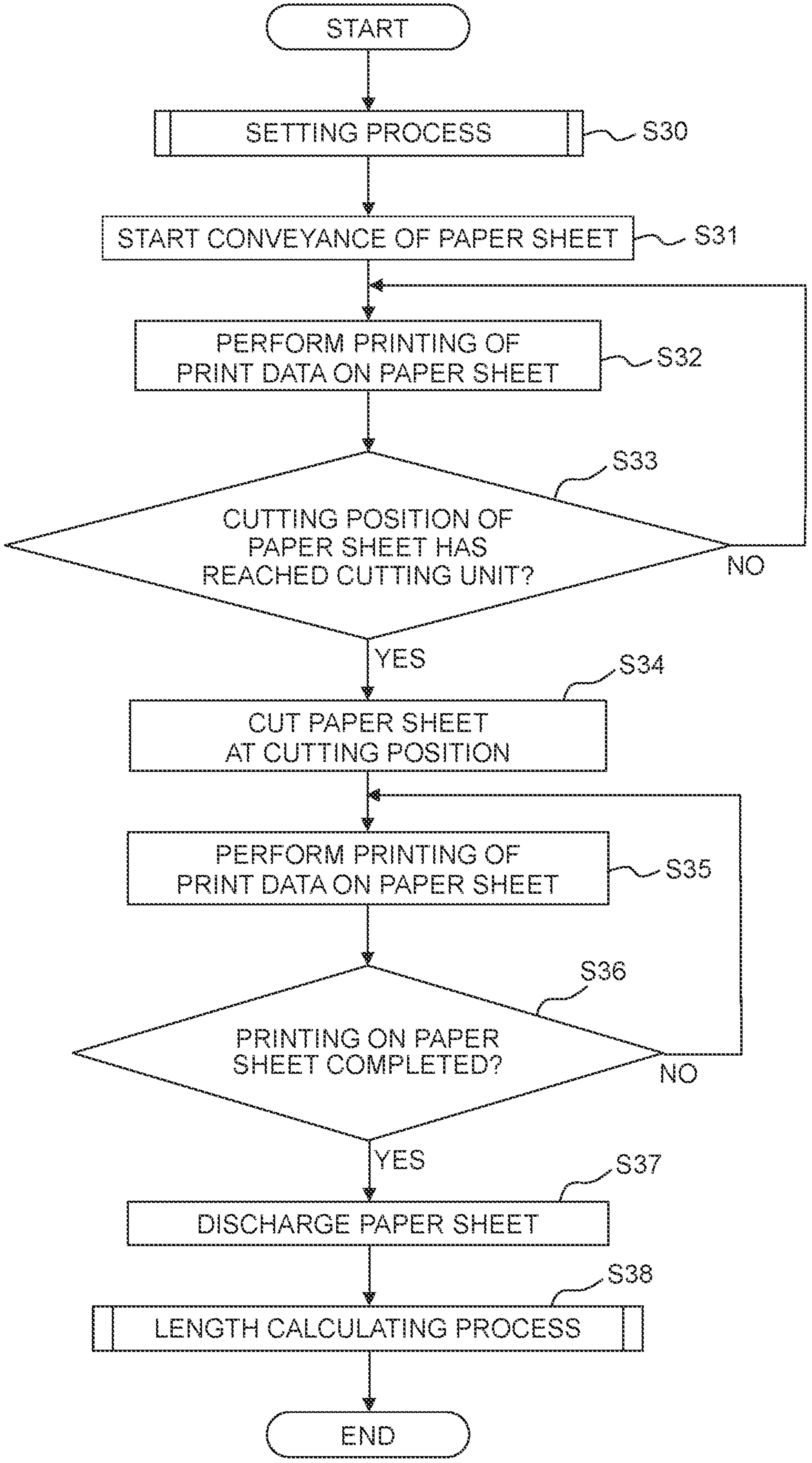
FIG. 7 is a flow chart depicting the flow of control by a controller of a printing apparatus according to a second embodiment.

A second embodiment of the present disclosure will be explained, with reference to FIGS. 7 and 8. Note that for convenience of explanation, members having the same functions as those of the members described in the above-described embodiment are denoted by the same reference numerals, and any explanation thereof will not be repeated. As compared with the flow of the control by the controller 100 in the first embodiment, the flow of the control by the controller 100 in the second embodiment is different from the flow of the control by the controller 100 in the first embodiment in a point that a process of cutting the paper sheet P (step S34) is executed. Note that the flow charts indicated, respectively, in FIGS. 7 and 8 are examples, and the present disclosure is not limited to these.

The flow of the control by the controller 100 of the printing apparatus 1 of the second embodiment will be explained, with reference to FIG. 7. Note that since steps S31, S32, S37 and S38 indicated in FIG. 7 correspond, respectively, to steps S2, S3, S5 and S6 indicated in FIG. 4, any explanation therefor will be omitted. In a case that the controller 100 receives the print job, the controller 100 executes the setting process (step S30).

Next, the setting process S30 will be explained, with reference to FIG. 8. Note that since steps S40, S41, S43, S45 and S46 indicated in FIG. 8 correspond, respectively, to steps S10 to S14 indicated in FIG. 5, any explanation therefor will be omitted.

Figure 8:
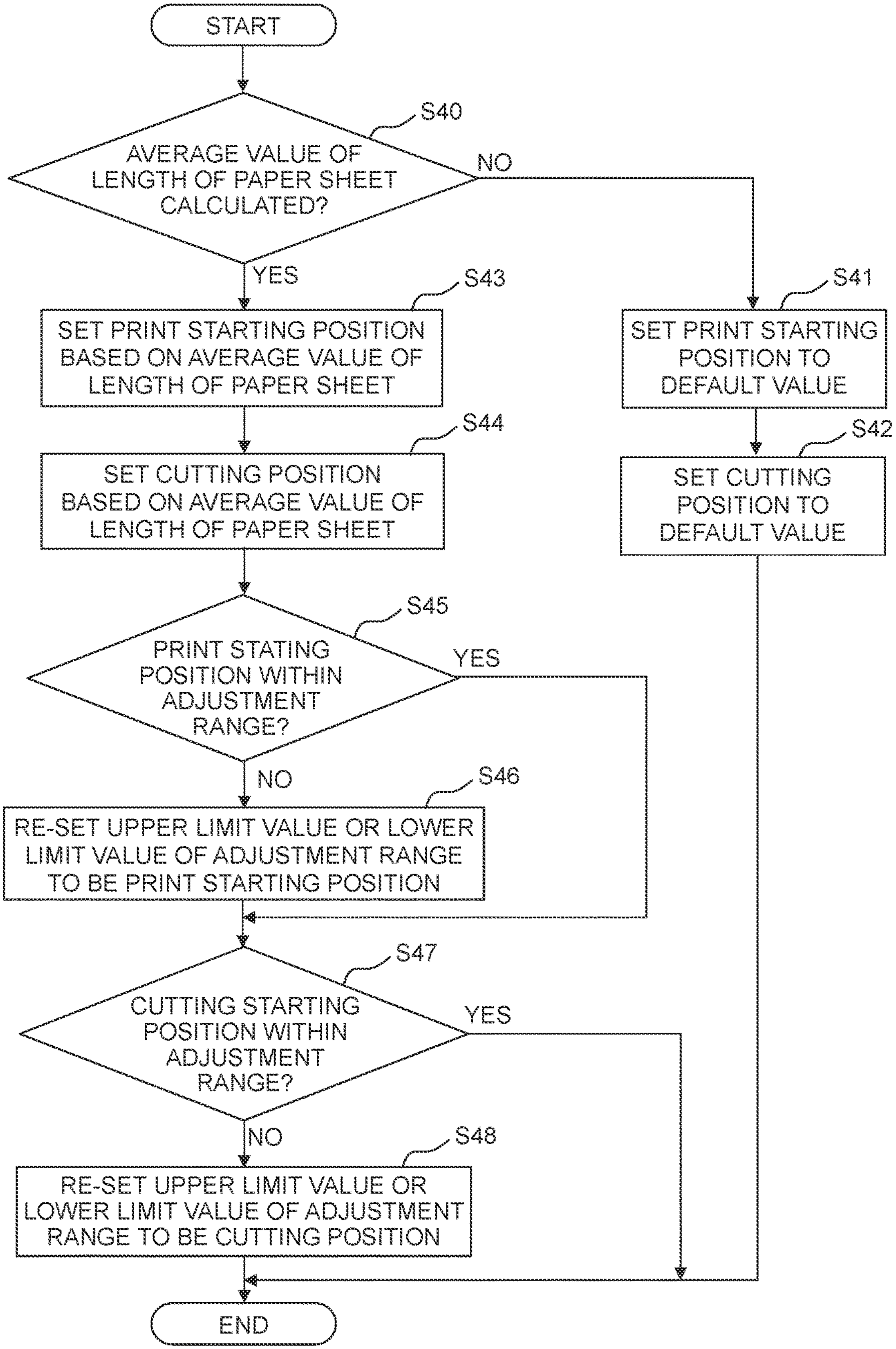
FIG. 8 is a flow chart depicting a setting process of FIG. 7.

As indicated in FIG. 8, in a case that the average value Lave of the length L of the paper sheet P is not calculated (step S40: NO), the controller 100 performs step S41 and then sets the cutting position CL to be a default value CLdef (step S42). Afterwards, the controller 100 ends the setting process S30. In a case that the average value Lave of the length L of the paper sheet P is calculated (step S40: YES), the controller 100 performs step S43 and then sets the cutting position CL from the average value Lave calculated in step S38 (step S44).

In step S44, the controller 100 sets the cutting position CL by using the default value CLdef of the cutting position with respect to the paper sheet P designated in the print job, the average value Lave of the length in the first conveying direction D1 of the paper sheet P calculated in step S38 and the length Ldef of the length in the first conveying direction D1 of the paper sheet previously determined with respect to the paper sheet P designated in the print job. The controller 100 sets the cutting position CL based on the following expression (2).

$$CL = \mathrm{CLdef} + (\mathrm{Lave} - \mathrm{Ldef})/2 \quad (2)$$

After step S46, the controller 100 determines as to whether or not the cutting position CL set in step S44 is within the adjustment range, of the cutting position CL, which has been previously determined (step S47). In a case that the cutting position CL set is included within the adjustment range (step S47: YES), the controller 100 ends the setting process S30. In a case that the cutting position CL which has been set in step S44 is not included within the adjustment range (step S47: NO), the controller 100 re-sets the cutting position CL to be the upper limit value or the lower limit value of the adjustment range (step S48). In a case that the cutting position CL set in step S44 exceeds the upper limit value of the adjustment range, then in step S48, the controller 100 sets the cutting position CL to be the upper limit value of the adjustment range. In a case that the cutting position CL set in step S44 is less than the lower limit value of the adjustment range, then in step S48, the controller 100 sets the cutting position CL to be the lower limit value of the adjustment range. Then, the controller 100 ends the setting process S30.

Returning again to FIG. 7, after step S32, the controller 100 determines as to whether or not the cutting position CL of the paper sheet P has reached the cutting unit 10 (step S33). In a case that the cutting position CL of the paper sheet P has not reached the cutting unit 10 (step S33: NO), the controller 100 executes step S32 again. In a case that the cutting position CL of the paper sheet P has reached the cutting unit 10 (step S33: YES), the controller 100 controls the cutting unit 10 so as to cut the paper sheet P at the cutting position CL (step S34).

Next, the controller 100 starts the printing with respect to the paper sheet P again (step S35). Then, the controller 100 determines as to whether or not the printing with respect to the paper sheet P is completed (step S36). In a case that the printing with respect to the paper sheet P is not completed (step S36: NO), the controller 100 executes step S35 again. In a case that the printing with respect to the paper sheet P is completed (step S36: YES), the controller 100 executes step S37.

Note that in the second embodiment, the process of cutting the paper sheet P may be executed after the completion of the printing of the print data with respect to the paper sheet P. Namely, step S33 and S34 may be executed after step S36.

(Operation and Effect of the Present Embodiment)

According to the above-described configuration, the cutting unit 10 cuts the print medium based on the calculated average value Lave of the length L of the paper sheet P. Accordingly, it is possible to cut the paper sheet P in accordance with the dimensional tolerance of the paper sheet P. With this, it is possible to make the variation in the length in the first direction D1 of the paper sheet P after the cutting to be small.

[Modification]

Figure 9A:
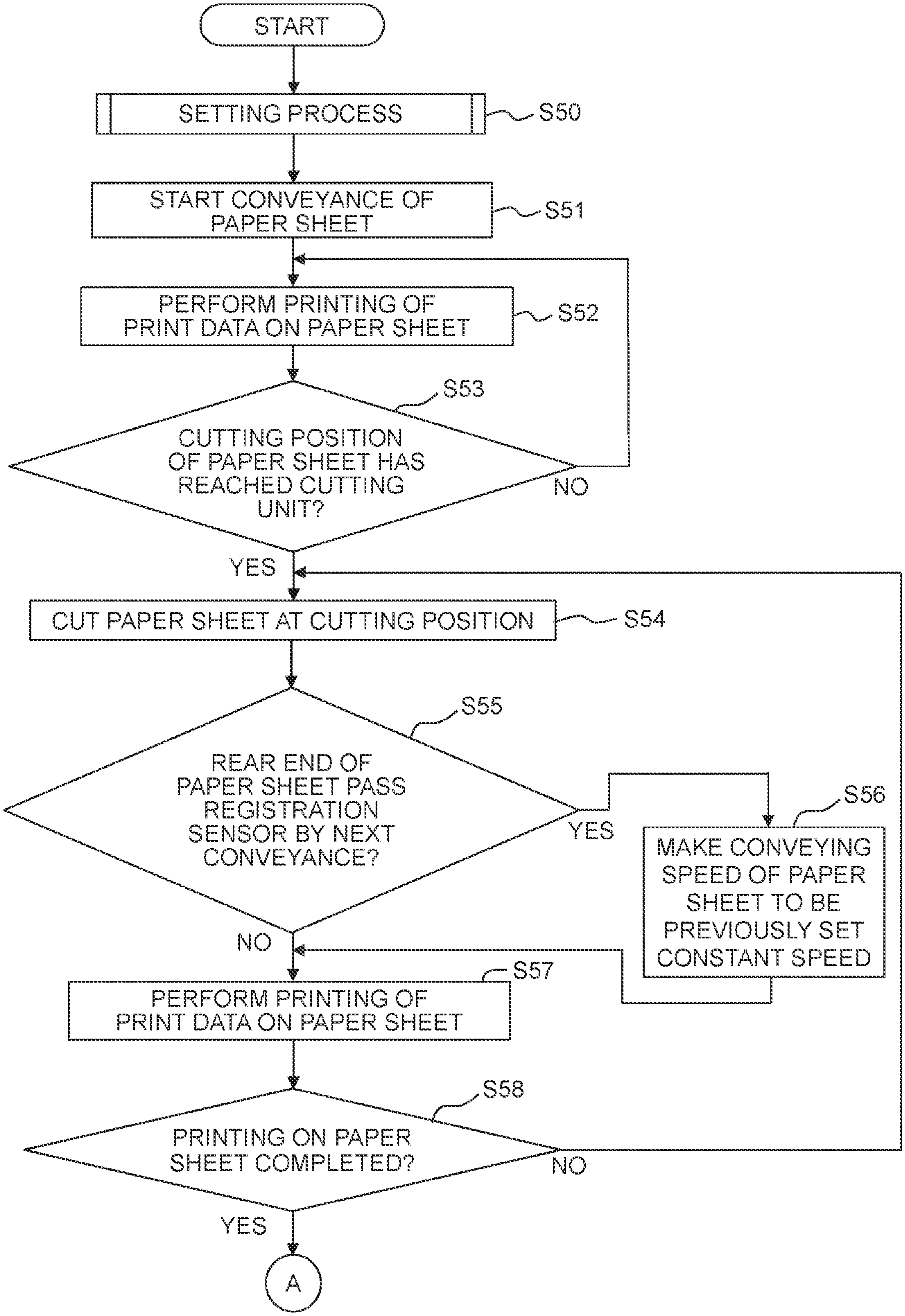
FIGS. 9A and 9B are a flow chart depicting the flow of control by a controller of a printing apparatus according to a modification of the second embodiment.
Figure 9B:
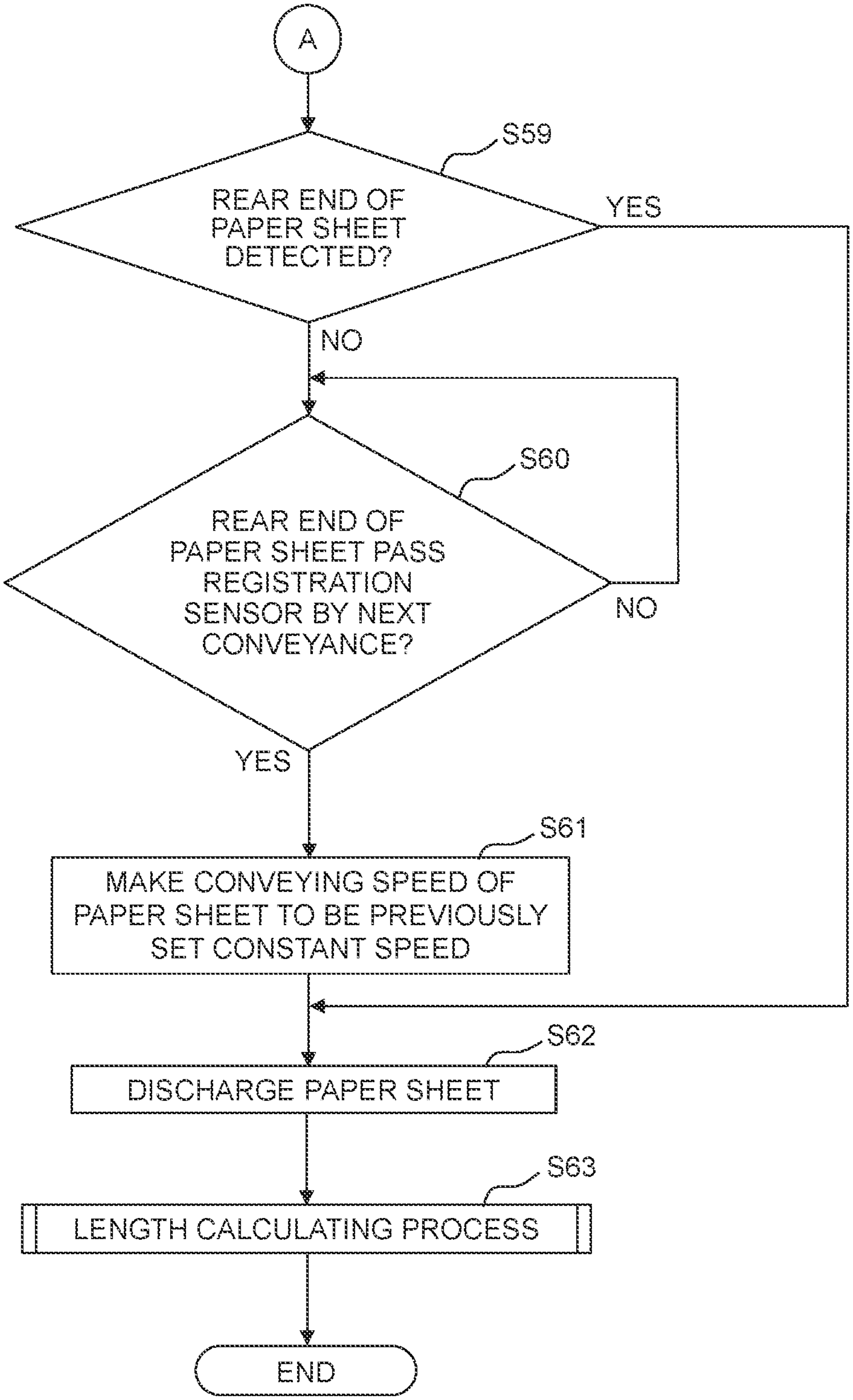

A modification of the flow of the control by the controller 100 of the printing apparatus 1 according to the second embodiment will be explained, with reference to FIGS. 9A and 9B. Note that since steps S50 to S54, S57, S58, S62 and S63 indicated in FIGS. 9A and 9B correspond, respectively, to steps S30 to S38 indicated in FIG. 7, any explanation therefor will be omitted. Further, the flow chart indicated in FIGS. 9A and 9B is an example, and the present disclosure is not limited to or restricted by the flow chart.

After performing step S54, the controller 100 determines as to whether or not the rear end in the first conveying direction D1 of the paper sheet P passes the registration sensor 120 by a next conveyance (step S55). In a case that the rear end of the paper sheet P does not pass the registration sensor 120 by the next conveyance (step S55: NO), the controller 100 executes step S57. In a case that the rear end of the paper sheet P passes the registration sensor 120 by the next conveyance (step S55: YES), the controller 100 controls the conveyance motor 108 so as to convey the paper sheet P by the conveyance rollers 60, 62, 64 and 66 at a previously determined conveying speed (step S56). In step S56, the controller 100 controls the conveyance motor 108 so that the conveying speed of the paper sheet P becomes to be the previously determined constant speed at a timing at which the rear end in the first conveying direction D1 of the paper sheet P passes the registration sensor 120.

After performing step S58, the controller 100 determines as to whether or not the registration sensor 120 detects the rear end of the paper sheet P (step S59). In a case that the registration sensor 120 detects the rear end of the paper sheet P (step S59: YES), the controller 100 executes step S62. In a case that the registration sensor 120 does not detect the rear end of the paper sheet P (step S59: NO), the controller 100 determines as to whether or not the rear end of the paper sheet P passes the registration sensor 120 by the next convenance (step S60). In a case that the rear end of the paper sheet P does not pass the registration sensor 120 by the next convenance (step S60: NO), the controller 100 repeats step S60. In a case that the rear end of the paper sheet P passes the registration sensor 120 by the next convenance (step S60: YES), the controller 100 controls the conveyance motor 108 so as to convey the paper sheet P by the conveyance rollers 60, 62, 64 and 66 at the previously determined conveying speed (step S61). Afterwards, the controller 100 proceeds to step S62.

(Operation and Effect of the Present Modification)

According to the above-described configuration, the controller 100 conveys the paper sheet P at the conveying speed of the paper sheet P, which is previously determined, at the timing at which the rear end of the paper sheet P passes the registration sensor 120.

Accordingly, any deviation is not generated in the calculated length L of the paper sheet P which would have otherwise generated due to the difference in the conveying speed. With this, it is possible to improve the accuracy of calculating the print medium length.

Third Embodiment

A third embodiment of the present disclosure will be explained, with reference to FIGS. 10A and 10B. Note that for convenience of explanation, members having the same functions as those of the members described in the above-described embodiments are denoted by the same reference numerals, and any explanation thereof will not be repeated. As compared with the flow of the control in each of the first and second embodiments, the flow of the control by the controller 100 in the third embodiment is different from the flow of the control in each of the first and second embodiments in a point that a second conveying process S74 is executed. Note that the flow chart indicated in FIGS. 10A and 10B is an example, and the present disclosure is not limited to this.

Figure 10A:
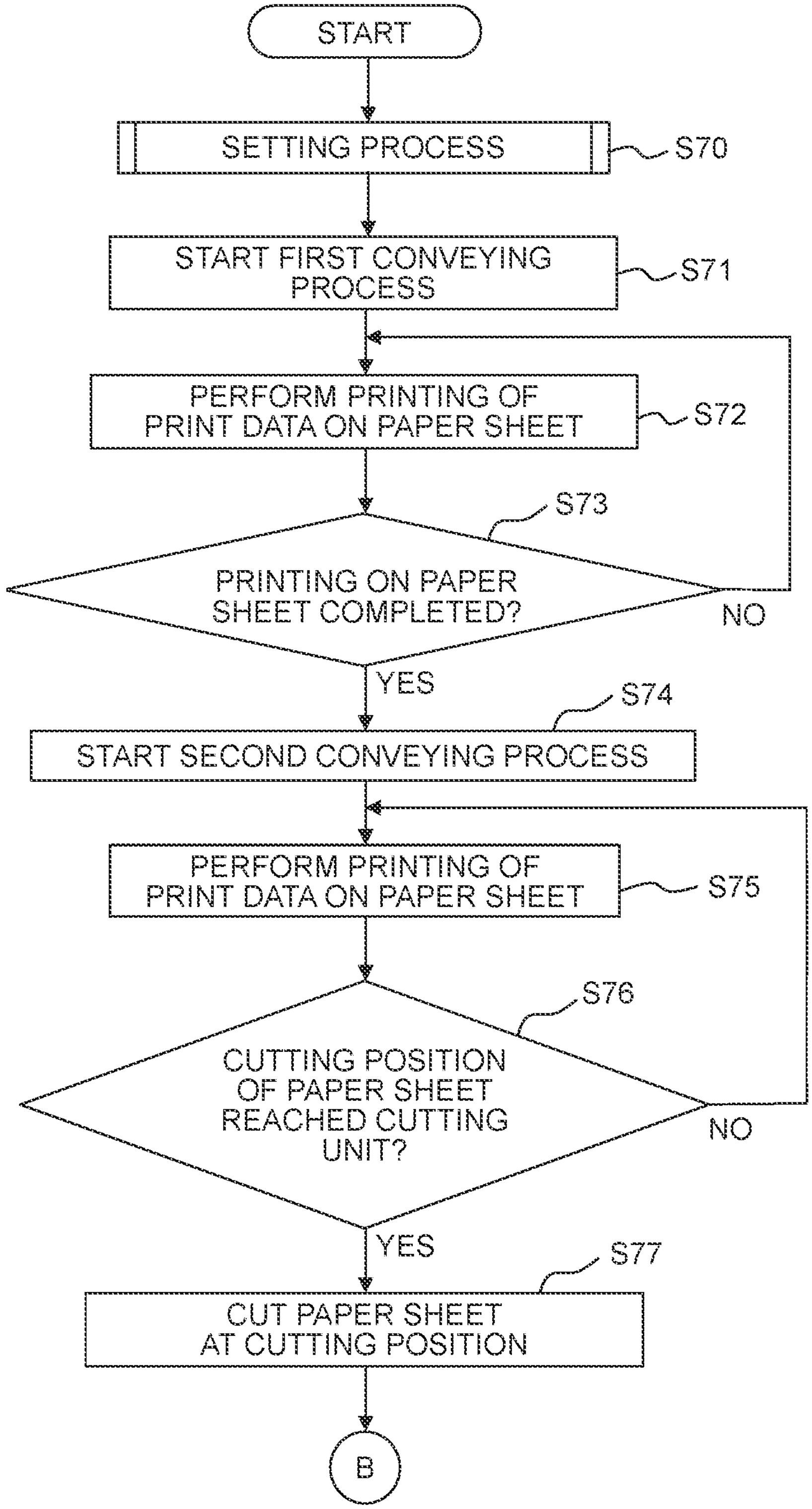
FIGS. 10A and 10B are a flow chart depicting the flow of control by a controller of a printing apparatus according to a third embodiment.
Figure 10B:
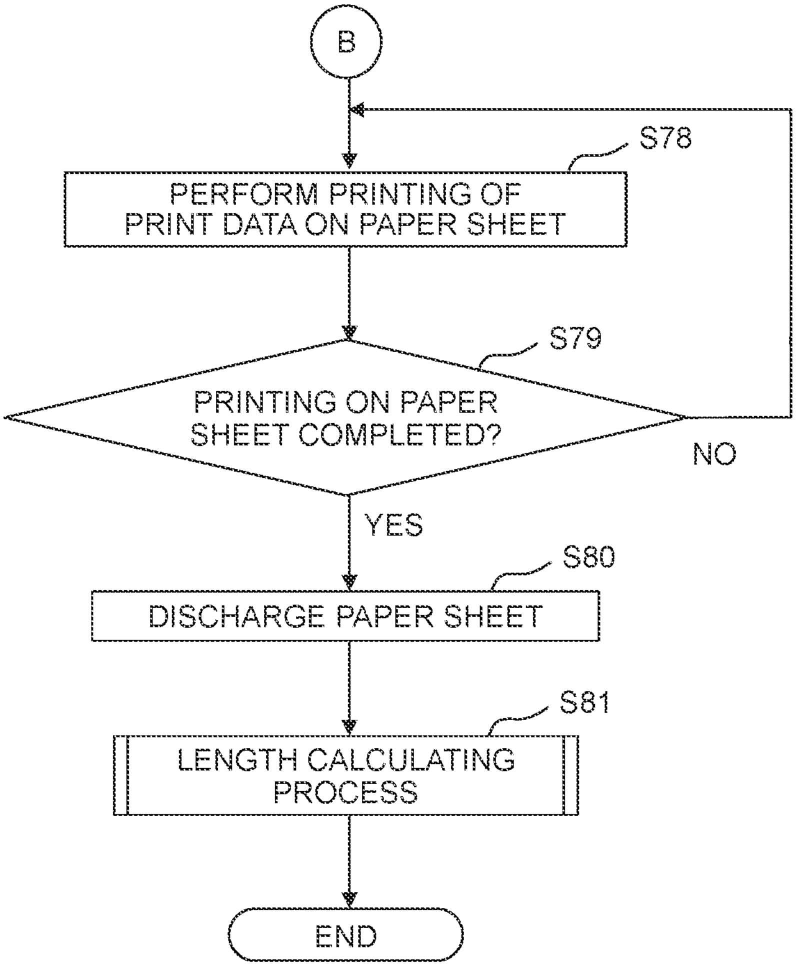

Since steps S70 and S76 to S81 indicated in FIGS. 10A and 10B correspond, respectively, to steps S30 and S33 to S38 indicated in FIG. 7, any explanation therefor will be omitted. As indicated in FIG. 10A, after performing step S70, the controller 100 starts a first conveying process (step S71). In step S71, the controller 100 controls the feed motor 107 and the conveyance motor 108 so as to convey, with the feed roller 24 and conveyance rollers 60, 62, 64 and 66, the paper sheet P to the first conveying route R1. In step S71, the controller 100 conveys the paper sheet P in the first conveying direction D1 in the first conveying route R1.

Next, the controller 100 controls the printing unit 3 so as to perform printing of the print data on a front surface of the paper sheet P conveyed in step S71 (step S72). In step S72, the controller 100 starts the printing of the print data with respect to the paper sheet P, based on the print starting position PL set in the setting process S70. Subsequently, the controller 100 determines as to whether or not the printing with respect to the front surface of the paper sheet P is completed (step S73). In a case that the printing with respect to the front surface of the paper sheet P is not completed (step S73: NO), the controller 100 executes step S72 again. In a case that the printing with respect to the front surface of the paper sheet P is completed (step S73: YES), the controller 100 proceeds to step S74.

Next, the controller 100 starts a second conveying process (step S74). In step S74, the controller 100 controls the conveyance motor 108 so as to convey, with the conveyance rollers 64, 66 and 68, the paper sheet P in the second conveying direction D2 in the second conveying route R2. In step S74, the controller 100 conveys the paper sheet P from the second conveying route R2 to the first conveying route R1, via the joining position W. In this situation, the paper sheet P is in a state that the front surface and the back surface of the paper sheet P are inverted at the joining position W.

Next, the controller 100 performs printing of the print data with respect to the back surface of the paper sheet P which is conveyed in step S74 (step S75). In step S75, the controller 100 starts the printing of the print data with respect to the paper sheet P based on the print starting position PL set in the setting process S70. Afterwards, the controller 100 executes the processes, respectively, of step S76 to S81.

Note that in the third embodiment, it is allowable that the process of cutting the paper sheet P is not executed. Namely, steps S76 and S77 may be omitted.

(Operation and Effect of the Present Embodiment)

According to the above-described configuration, the print position of the print data printed on the front surface of the paper sheet P and the print position of the print data printed on the back surface of the paper sheet P are determined by using the print starting position PL set in the setting process S70. Accordingly, it is possible to perform the printing on both surfaces of the paper sheet P in accordance with the dimensional tolerance of the paper sheet P. With this, it is possible to make any deviation in the first conveying direction D1 of the print data, in the case of performing printing on both surfaces of the paper sheet P, between the print data printed on the front surface of the paper sheet P and the print data printed on the back surface of the paper sheet P to be small.

[Other Modifications]

In the first to third embodiments, in a case that a previously determined condition is established, the controller 100 may further execute a re-setting process of setting the print starting position PL of the paper sheet P to be a default value PLdef which has been previously determined. After the previously determined condition is established, in the re-setting process, the controller 100 sets the print starting position PL of a paper sheet P which is to be conveyed first to be the default value PLdef. Afterwards, in the above-described length calculating process, the controller 100 calculates the average value Lave of the length L of the paper sheet P by using the length L in the first conveying direction D1 of a paper sheet P which is conveyed after the above-described, previously determined condition has been established. Namely, after the controller 100 executes the re-setting process, the controller 100 newly calculates the average value Lave of the length L of the paper sheet P.

According to the above-described configuration, in a case that the previously determined condition is established, the print starting position of the paper sheet P is set to be the default value PLdef. Accordingly, it is possible to set the print starting position in accordance with the dimensional tolerance of the paper sheet P accommodated in the feed tray 21. With this, it is possible to make, in the first direction D1, the deviation between the center position of the length of the paper sheet P and the center position of the print data printed on the paper sheet P to be small.

The previously determined condition may be such a condition that the installation sensor 123 detects that the feed tray 21 is installed in the printing apparatus 1. Alternatively, the previously determined condition may be such a condition that a sensor detects that the feed tray 21 is detached from the printing apparatus 1. Still alternatively, the previously determined condition may be such a condition that a sensor detects that the paper sheet(s) P is (are) not accommodated in the feed tray 21.

According to the above-described configuration, the print staring position PL is set to be the default value PLdef at a timing at which the feed tray 21 is installed in the printing apparatus 1, at a timing at which the feed tray 21 is detached from the printing apparatus 1, or at a timing at which there is no paper sheet P in the feed tray 21 (all the paper sheet P in the feed tray 21 is used). Accordingly, it is possible to set the print starting position PL in accordance with the dimensional tolerance of a bundle of the paper sheet P which is newly accommodated in the feed tray 21. With this, it is possible to make, in the first direction D1, the deviation between the center position of the length of the paper sheet P accommodated in the feed tray 21 and the center position of the print data printed on the paper sheet P to be small.

Further, the previously determined condition may be such a condition that the setting unit 124 receives, from the user, input of a setting regarding the length of the paper sheet P. Here, the term "setting regarding the length of the paper sheet P" is exemplified by, a case of changing the size of the paper sheet from the A3 size to the A4 size in the print job, a case of changing a feed tray to be used, etc.

According to the above-described configuration, at the timing at which the setting unit 124 receives the operation from the user, the print starting position PL is set to be the default value PLdef. Accordingly, at the timing at which the user operates the setting unit, it is possible to set the print starting position in accordance with the dimensional tolerance of the paper sheet P accommodated in the feed tray 21. With this, it is possible to make, in the first direction D1, the deviation between the center position of the length of the paper sheet P accommodated in the feed tray 21 and the center position of the print data printed on the paper sheet P to be small.

In the above-described first to third embodiments, the paper sheet P is cut by the cutting unit 10 to thereby cut the paper sheet P into a plurality of paper sheets. The present disclosure, however, is not limited to this. It is allowable that the printing apparatus 1 is provided with a perforating process unit configured to execute a perforating process with respect to the paper sheet P, as an example of a processing unit, rather than the cutting unit 10. In such a case, the controller 100 executes a process of executing the perforating process at a perforating process position of the paper sheet P. The perforating process position is set, for example, based on the average value Lave of the length L of the paper sheet P calculated in the above-described length calculating process, etc.

Further, it is also allowable that the printing apparatus 1 is provided with a creasing process unit 10A which is configured to execute a creasing process with respect to the paper sheet P, as an example of the processing unit, instead of the cutting unit 10. In such a case, the controller 100 executes a process of executing the creasing process at a creasing process position of the paper sheet P. The creasing process position is set, for example, based on the average value Lave of the length L of the paper sheet P calculated in the above-described length calculating process, etc.

In the length calculating process of the above-described first to third embodiments, the average value Lave of the length L in the first conveying direction D1 of the paper sheet P is calculated as the print medium length. The present disclosure, however, is not limited to this. In the length calculating process, it is allowable to calculate the median or the mode of the length L in the first conveying direction D1 of the paper sheet P, as the print medium length. Further, in the setting process, it is allowable that the controller 100 sets the print starting position PL per each of the paper sheets P which are being conveyed, by using the length L of a paper sheet P which has been conveyed immediately before each of the paper sheets P.

In the above-described first to third embodiments, it is allowable to use the media sensor 122 as the first detecting unit, instead of the registration sensor 120, to thereby calculate the length in the first conveying direction D1 of the paper sheet P. Further, it is also allowable to use the registration sensor 120 and the media sensor 122 in combination. For example, it is allowable to provide such a configuration that the front end of the paper sheet P is detected by the media sensor 122 and that the rear end of the paper sheet P is detected by the registration sensor 120, or a configuration reverse to the above-described configuration.

The present disclosure is not limited to each of the embodiments and modifications described above, and various changes can be made within the scope of the claims; an embodiment which is obtained by appropriately combining the technical means disclosed in each of the embodiments and modifications is also included in the technical scope of the present disclosure.

What is claimed is:

1. A printing apparatus comprising:

an accommodating unit configured to accommodate a plurality of print media;

a first conveying unit configured to pick up a print medium included in the print media from the accommodating unit and to convey the print medium along a first conveying direction;

a printing unit configured to print an image on the print medium in accordance with print data included in a print job;

a first detecting unit configured to detect a front end and a rear end in the first conveying direction of the print medium being conveyed by the first conveying unit; and a controller configured to execute:

a length calculating process of calculating a print medium length which is a length in the first conveying direction of the print medium by using a plurality of results of detections, each of which is regarding a detection of the front end and the rear end of a respective one of the print media by the first detecting unit;

a setting process of setting, based on the print medium length calculated in the length calculating process, a print starting position as a position at which printing is to be started in the printing unit; and a first printing process of printing the image on the print medium in accordance with the print data in the printing unit, based on the print starting position set in the setting process.

2. The printing apparatus according to claim 1, wherein in the length calculating process, the controller is configured to calculate an average value of lengths in the first conveying direction of the print media, as the print medium length, by using the results of the detections each of which is regarding a respective one of the print media, and in the setting process, the controller is configured to set the print starting position based on the average value.

3. The printing apparatus according to claim 1, wherein in the length calculating process, in a case that number of the results of the detections is not more than a predetermined number, the controller is configured to calculate the print medium length by using the lengths in the first conveying direction of the print media, which are calculated by using the results of the detections, and by using a length of a paper sheet which is previously set in accordance with a size of the print medium specified in the print job.

4. The printing apparatus according to claim 1, wherein in the length calculating process, in a case that the controller determines that the length in the first conveying direction of the print medium calculated by using the result of the detection is not included in an appropriate range which is previously set, the controller is configured not to include the result of the detection in the results of the detections.

5. The printing apparatus according to claim 1, wherein in the setting process, in a case that the controller determines that the print starting position is not included in an adjustment range which is previously set, the controller is configured to set the print starting position based on one of an upper limit value or a lower limit value of the adjustment range.

6. The printing apparatus according to claim 5, wherein in the setting process, in a case that the controller determines that the print medium length is not included within a range of a permissible error in accordance with a standard of a size of the print medium specified in the print job, the controller is configured to set the print starting position based on one of an upper limit value or a lower limit value of the permissible error.

7. The printing apparatus according to claim 1, wherein in a case that a previously determined condition is established, the controller is configured to execute a re-setting process of setting the print starting position to be a previously determined default value.

8. The printing apparatus according to claim 7, further comprising a second detecting unit configured to detect as to whether the accommodating unit is installed in the printing apparatus, wherein in the re-setting process, the controller is configured to set the print starting position to be the previously determined default value under a condition that the second detecting unit detects that the accommodating unit is installed in the printing apparatus.

9. The printing apparatus according to claim 7, further comprising a second detecting unit configured to detect as to whether the accommodating unit is detached from the printing apparatus, wherein in the re-setting process, the controller is configured to set the print starting position to be the previously determined default value under a condition that the second detecting unit detects that the accommodating unit is detached from the printing apparatus.

10. The printing apparatus according to claim 7, further comprising a second detecting unit configured to detect as to whether the print medium is accommodated in the accommodating unit, wherein in the re-setting process, the controller is configured to set the print starting position to be the previously determined default value under a condition that the second detecting unit detects that the print medium is not accommodated in the accommodating unit.

11. The printing apparatus according to claim 7, further comprising a setting unit configured to receive an input, from a user, regarding setting of the print medium length, wherein in the re-setting process, the controller is configured to set the print starting position to be the previously determined default value under a condition that the setting unit receives the input with respect to the setting of the print medium length.

12. The printing apparatus according to claim 1, wherein in the length calculating process, the controller is configured to correct the print medium length by referring to a conveying speed of the print medium which passes the first detecting unit.

13. The printing apparatus according to claim 1, wherein the controller is configured to control the first conveying unit such that the print medium is conveyed at a conveying speed previously determined, at a timing at which the rear end of the print medium passes the first detecting unit.

14. The printing apparatus according to claim 1, further comprising a processing unit configured to process the print medium by moving in a state of the processing unit contacting the print medium, wherein the controller is configured to further process the print medium by the processing unit, based on the print medium length calculated in the length calculating process.

15. The printing apparatus according to claim 1, further comprising:

a first conveying route via which the print medium is conveyed in the first conveying direction by the first conveying unit;

a second conveying route extending toward a second conveying direction, which is direction conveying the print medium back toward the printing unit, at a branching position on a downstream side in the first conveying direction in the first conveying route with respect to the printing unit, the second conveying route being connected to a joining position which is on an upstream side in the first conveying direction in the first conveying route with respect to the printing unit; and a second conveying unit configured to convey the print medium in the second conveying direction in the second conveying route, wherein the controller is configured to further execute:

a first conveying process of conveying the print medium to the printing unit along the first conveying direction by the first conveying unit so as to print the print data on a front surface of the print medium in the first printing process;

a second conveying process of conveying, after executing the first conveying process, the print medium to the second conveying route by the second conveying unit, and of conveying the print medium to the printing unit in a state that the front surface and a back surface of the print medium are inverted at the joining position; and a second printing process of printing the print data on the back surface of the print medium which is conveyed in the second conveying process, based on the print starting position set in the setting process.

* * * * *